(12) United States Patent
Kapitza et al.

(10) Patent No.: US 9,533,428 B2
(45) Date of Patent: Jan. 3, 2017

(54) PRODUCTION OF A TOWER

(75) Inventors: Jan Kapitza, Grossefehn (DE);
Karsten Albers, Hinte (DE); Gunther Horn, Aurich (DE)

(73) Assignee: WOBBEN PROPERTIES GMBH, Aurich (DE)

( * ) Notice: Subject to any disclaimer, the term of this patent is extended or adjusted under 35 U.S.C. 154(b) by 0 days.

(21) Appl. No.: 14/127,813

(22) PCT Filed: Jun. 14, 2012

(86) PCT No.: PCT/EP2012/061333
§ 371 (c)(1),
(2), (4) Date: Mar. 7, 2014

(87) PCT Pub. No.: WO2012/175406
PCT Pub. Date: Dec. 27, 2012

(65) Prior Publication Data
US 2014/0208665 A1    Jul. 31, 2014

(30) Foreign Application Priority Data
Jun. 22, 2011   (DE) ........................ 10 2011 078 016

(51) Int. Cl.
*B28B 7/02*    (2006.01)
*B28B 7/00*    (2006.01)
(Continued)

(52) U.S. Cl.
CPC .............. *B28B 7/02* (2013.01); *B28B 7/0035* (2013.01); *B28B 7/22* (2013.01); *B28B 17/0072* (2013.01);
(Continued)

(58) Field of Classification Search
None
See application file for complete search history.

(56) References Cited

U.S. PATENT DOCUMENTS 5,748,322 A    5/1998  Konder et al.
7,276,808 B2  10/2007  Weitkamp et al.
(Continued)

FOREIGN PATENT DOCUMENTS

| AT | 000 269 U1 | 6/1995 |
|----|------------|--------|
| CH | 367745 A   | 2/1963 |

(Continued)

OTHER PUBLICATIONS

Machine translation of EP 1 544 376 A2, Jun. 22, 2005.*
(Continued)

*Primary Examiner* — Benjamin Schiffman
(74) *Attorney, Agent, or Firm* — Seed IP Law Group LLP

(57) ABSTRACT

The present invention relates to a method for producing a tower segment of a concrete tower of a wind energy installation, comprising the steps: providing a segment mold having at least one formwork for defining a mold of the tower segment that is to be produced and for filling with concrete; filling the segment mold with concrete in order to form the tower segment by the subsequent hardening of the concrete; measuring the tower segment thus hardened for creating a three-dimensional, virtual actual model of said tower segment; producing said three-dimensional actual model; comparing the three-dimensional actual model with a predefined mold, in particular a stored three-dimensional, virtual target model; and determining a deviation between both virtual models and changing the segment mold, in particular changing the at least one formwork when the deviation exceeds a first predefined threshold value.

7 Claims, 9 Drawing Sheets

(51) Int. Cl.
  *B28B 7/22* (2006.01)
  *B28B 17/00* (2006.01)
  *B28B 21/02* (2006.01)
  *B28B 21/82* (2006.01)
  *B28B 23/00* (2006.01)
  *E04H 12/12* (2006.01)
  *G01B 11/24* (2006.01)
  *E04H 12/34* (2006.01)
  *E04B 1/343* (2006.01)
  *E04G 13/02* (2006.01)
  *E04H 12/16* (2006.01)

(52) U.S. Cl.
  CPC ............... *B28B 21/02* (2013.01); *B28B 21/82* (2013.01); *B28B 23/005* (2013.01); *E04B 1/34331* (2013.01); *E04B 1/34347* (2013.01); *E04G 13/02* (2013.01); *E04H 12/12* (2013.01); *E04H 12/16* (2013.01); *E04H 12/341* (2013.01); *E04H 12/342* (2013.01); *G01B 11/24* (2013.01); *Y02E 10/721* (2013.01)

(56) References Cited

U.S. PATENT DOCUMENTS

| | | | |
|---|---|---|---|
| 7,530,780 | B2 | 5/2009 | Kothnur et al. |
| 8,505,244 | B2 | 8/2013 | Gomez et al. |
| 2008/0313972 | A1 | 12/2008 | Grob et al. |
| 2010/0132282 | A1 | 6/2010 | Voss |
| 2010/0278418 | A1 | 11/2010 | Chang et al. |
| 2013/0025229 | A1 | 1/2013 | Kapitza et al. |

FOREIGN PATENT DOCUMENTS

| | | | |
|---|---|---|---|
| CN | 1842632 | A | 10/2006 |
| CN | 2881142 | Y | 3/2007 |
| CN | 101109359 | A | 1/2008 |
| CN | 101384781 | A | 3/2009 |
| DE | 19801330 | A1 | 7/1999 |
| DE | 102 40 708 | A1 | 2/2004 |
| DE | 20 2010 000 169 | U1 | 6/2010 |
| DE | 10 2010 005 991 | A1 | 7/2011 |
| EP | 1544376 | A2 * | 6/2005 |
| EP | 1 876 316 | A1 | 1/2008 |
| JP | 2000-321063 | A | 11/2000 |
| KR | 10-2011-0025147 | A | 3/2011 |
| SU | 1278482 | A1 | 12/1986 |
| TW | 201040764 | A1 | 11/2010 |
| WO | 02/04766 | A2 | 1/2002 |
| WO | 2004/007955 | A1 | 1/2004 |
| WO | 2009/121581 | A2 | 10/2009 |
| WO | 2011/045319 | A1 | 4/2011 |

OTHER PUBLICATIONS

Akinci, Burcu, et al. "A formalism for utilization of sensor systems and integrated project models for active construction quality control." Automation in Construction 15.2 (Mar. 2006): 124-138.*

Rauno Heikkila et al., "Dreidimensionales Mess—Und Prufsystem Fur Die Produktion Architektonischer Betonfertigteile, Three-Dimensional Control System for Precast Architectural Concrete Production" BFT International, Bauverlag, Gutersloh, DE, Oct. 1, 1994, pp. 62-67.

* cited by examiner

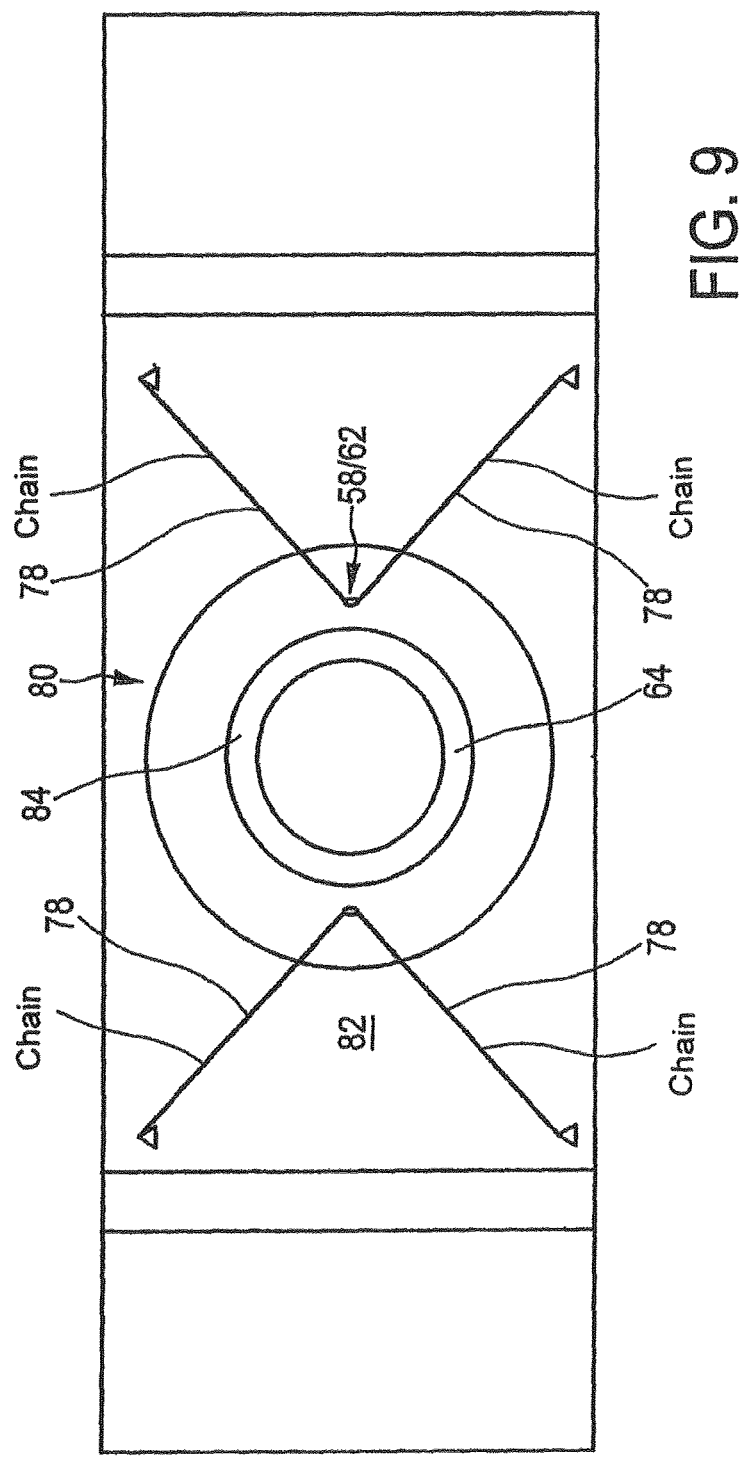

PRODUCTION OF A TOWER

BACKGROUND

Technical Field

The present invention concerns a process for the production of a pylon segment of a concrete pylon of a wind power installation and a shuttering for production of such a pylon segment.

Description of the Related Art

Wind power installations, in particular those with a horizontal rotor axis as shown in FIG. 1, are nowadays enjoying increasing popularity.

Such wind power installations have a pod having an aerodynamic rotor. That pod with rotor can be of a weight of far more than 100 t (metric ton), depending on the size of the respective installation. The pod is supported on a pylon which can be in the form of a concrete pylon or a steel pylon and which has to carry the load of the pod and transmit it to a foundation. That load includes a load due to the weight of the pod and a load because of the wind pressure on the rotor in operation of the wind power installation.

Concrete pylons of wind power installations are typically made up of pylon segments, namely precast concrete parts of steel reinforced concrete. In that way they are fundamentally different from concrete pylons which are constructed from so-called on-site concrete, that is to say directly on site by means of a climbing shuttering or formwork, as is usual for example with television towers. In that respect the demands made on a concrete pylon of a wind power installation are different from another concrete pylon or tower. One of the specific demands is also the wind loading which has already been described above on the rotor, and thus on the pod and accordingly on the head of the pylon.

In accordance with a form of a wind power installation the pylon converges conically from below from its foundation upwardly towards its head. The pylon segments which are placed in superposed relationship for that purpose are to be appropriately adapted to each other at the junction locations. That involves in particular the shape and diameter of the segments in question in the region in which they are placed one upon the other. If a deviation between two segments to be placed one upon the other is excessively great here the concrete pylon in question can no longer be produced with an adequate manufacturing quality. At least one of the pylon segments to be assembled is then to be sorted out as reject and replaced by a suitable segment of better dimensions which in particular are more accurately observed. At least one shuttering used for production of the reject pylon segment has to be suitably modified or replaced. Sorting out such a reject pylon segment and possibly replacing a shuttering which has been used gives rise to unnecessary costs and can lead to a time delay when constructing a wind power installation.

A conically converging wind power installation pylon composed of a multiplicity of pylon segments, namely precast concrete parts, requires a correspondingly large number of different pylon segments. Those different pylon segments require a corresponding number of shutterings, that is to say formworks for pouring the respective concrete pylon segment. If wind power installations of differing size are produced then that needs concrete pylons of correspondingly different sizes and accordingly the number of necessary pylon segments and necessary shuttering arrangements increases. In particular when involving larger pylons and a larger number of different pylons the number of different pylon segments and shutterings required rises to a corresponding degree and can become a logistical and/or organizational problem in the enterprise in question dealing with production of the pylon segments. At least expenditure on logistics and organization increases considerably.

To produce concrete pylon parts, that is to say concrete segments, namely precast concrete parts, concrete shutterings are used, which form a cavity into which the concrete is poured. A corresponding reinforcement is also provided therein and, after the concrete has set, it is removed from the shuttering and then subjected to further processing. An inner and an outer shuttering can be used for production of frustoconical pylon segments or corresponding segment portions. Accordingly an inner and an outer shuttering are required. After the concrete has set the outer shuttering which can weigh 5 t to 10 t can be lifted away by means of a crane so that the hardened precast concrete part is accessible and can be transported in turn by means of a crane for further processing. That operation is complicated and expensive and requires a high degree of involvement of correspondingly heavy machines, which in turn increases the effort involved in production and makes production more expensive.

In that respect finally the pylon segments are to be transported by means of a flat-bed truck from the production factory which produced the pylon segments in the form of precast concrete parts, to the respective location for erection of a wind power installation so that a concrete pylon of a wind power installation can be set up there by means of those pylon segments.

As such segments are substantially in the shape of a truncated cone casing or a segment of a truncated cone casing they give rise to particular problems upon transportation on such a flat-bed truck. In that case the precast concrete parts are usually to be transported in the standing position because that requires the smallest amount of space when they are being transported. Concrete segments are sometimes produced as large as possible, but nonetheless so small that they can still be transported on road. In that respect generally permissible maximum dimensions apply. A particular requirement is that such a large pylon segment or a plurality thereof are to be securely and safely transported on the road by means of a flat-bed truck. If they are not sufficiently tightly strapped down by mistake there is the risk that in a bend they tip off the low-bed truck or undesirably slide around when the truck brakes. That can occur in particular when the pylon segment is strapped down by strapping which can come loose by virtue of slight slippage because of the rounded configurations of the respective pylon segment.

BRIEF SUMMARY

One or more embodiments of the present invention are to address at least one of the above-mentioned problems, and in particular to improve production and transport of pylon segments of concrete pylons of wind power installations. In particular one embodiment seeks to provide more accurate production and/or a simplification in the manufacture of pylon segments and/or an improvement in the manufacture of different concrete pylons for wind power installations and/or the transport of pylon segments of concrete pylons of wind power installations. At the least one embodiment seeks to propose an alternative solution.

One embodiment concerns a production apparatus for the production of such pylon segments, including a concrete pylon comprising pylon segments and a wind power installation having such a concrete pylon. The embodiment further concerns a concrete pylon group which includes at least two different concrete pylons, including a wind park having such a concrete pylon group. Another embodiment concerns a process for the production of concrete pylons of wind power installations, which includes a fastening anchor for securing a pylon segment of a concrete pylon to be constructed of a wind power installation upon transport on a flat-bed truck. Furthermore another embodiment concerns a securing apparatus for securing a pylon segment of a concrete pylon to be constructed of a wind power installation upon transport on a flat-bed truck. The present invention further concerns an apparatus for measuring a said pylon segment.

According to one embodiment, there is proposed a process for the production of a pylon segment of a concrete pylon of a wind power installation. Accordingly a shuttering which forms a segment mold is filled with concrete. When the concrete has hardened it is of the shape predetermined by the segment mold and thus forms the pylon segment. The segment mold can for example substantially consist of two shutterings which are so arranged relative to each other that formed therebetween is a space for filling with concrete and for predetermining the shape of the pylon segment to be manufactured. After the concrete has set to form a pylon segment the pylon segment is measured to produce a three-dimensional virtual actual model of the pylon segment. In this connection the expression a hardened pylon segment is used to denote such a segment which is so hard, in which therefore the concrete has set to such an extent, that the pylon segment retains its shape and can be subjected to further processing. At that moment it is not yet necessary for the pylon segment to have already reached its final strength which is typically required when being fitted into a concrete pylon.

The pylon segment is measured in such a way that a three-dimensional actual model can be produced and such an actual model is then produced, namely as a virtual model. If for example—to use a simple case for explanatory purposes—a pylon segment is produced, which is to have a frustoconical casing, then a few measurement values may already be sufficient to produce a model of a frustoconical casing having the specific dimensions of the pylon segment. Purely theoretically, the recording of three measurement points is sufficient for numerically determining and modelling a circular outside edge such as for example an upper outer edge of the pylon segment. It will be noted however that in such a case, it is not possible to determine deviations from a circle. If deviations such as for example deformation of a circle towards an elliptical shape are to be determined for that upper outer edge as referred to above by way of example, then further measurement points are required. Other regions of the measured pylon segment can be detected in the modelling procedure—using further measurement points—for example by way of a linear relationship.

Basically, redundancy in determination of the object by recording more and in particular markedly more measurement points is to be proposed as theoretically necessary. In that case, the problem can arise that the shape which is basically adopted—such as for example an elliptical shape—does not contain every measurement point in accordance with the concrete modelling thereof. Nonetheless it is possible to effect modelling if for example the least squares method is used for calculating the modelled portion from the measurement points.

The virtual model can also be composed of finite elements. That can depend inter alia on the underlying prerequisites and in particular whether the basic starting point adopted is compliance with certain basic shapes or whether in that respect nothing is yet to be laid down in the modelling procedure.

In this case the reference to a virtual model is used to mean that the model is not physically present but is present in the form of a model in a data processing apparatus, in particular a process computer. In the same fashion, the basis adopted is a reference model, to which the virtual actual model produced from the pylon segment is compared in terms of geometrical dimensions in order to quantitatively and qualitatively determine geometrical deviations. Here the reference to the actual model means the model of the measured pylon segment. Minor deviations between the actual model and the measured pylon segment cannot be avoided.

After comparison of the three-dimensional actual model with a predetermined form like the virtual reference model, the detected deviations are evaluated. In that respect the respective greatest deviations are considered in particular in portion-wise fashion, such as for example the greatest deviation with respect to the height of the measured segment in relation to the predetermined segment, the greatest deviation in the diameter of an outside contour, which is horizontal in accordance with requirements, of the actual model with respect to the reference model, the greatest deviation in a wall thickness of the actual model from that of the reference model and the greatest deviation of a non-circular outside contour of the actual model from a circular outside contour predetermined by the reference model. Those are only examples of such deviations. It is also possible to use deviations other than the respectively greatest deviation, such as for example a mean deviation. That at least one deviation is then compared to a predetermined first limit value. That limit value is accordingly predetermined in dependence on the permissible tolerances and also in dependence on whether a respective maximum deviation value, an average deviation value or another deviation value forms the basis for the comparison procedure. If that limit value is exceeded the form used, in particular a shuttering employed, is to be appropriately adapted. Adaptation can be effected for example by applying material to the shuttering or removing material therefrom, or by deformation of the shuttering. In the extreme case replacement of the shuttering in question is considered.

Preferably measurement of the respective pylon segment is effected by a laser measuring device. Such a laser measuring device can also three-dimensionally determine a multiplicity of measurement points and is preferably adapted to input the recorded measurement values into a data processing system or to prepare the latter so that the actual model can be calculated and the described comparison can be implemented.

Preferably measurement of the pylon segment is effected with an accuracy of 5 mm or higher, in particular 2 mm or higher, and further preferably 1 mm or higher. The first predetermined limit value is preferably 10 mm or less, in particular 5 mm or less and further preferably 2 mm or less.

A degree of accuracy in the millimeter range is achieved for a concrete segment by the proposed procedure. In that respect it is to be observed that such pylon segments can regularly be of an outside dimension, that is to say a width, of 5 m. If—in relation to a plan view—part-circular segments are produced, such as for example semicircular segments or quarter-circular segments, they can be of a still greater longitudinal direction—in relation to preferred transport on the road—and can be correspondingly intended for even larger pylon diameters.

Nonetheless a degree of accuracy in the millimeter range is proposed, which goes beyond the usual levels of accuracy with the aforementioned order of magnitude for concrete elements.

In accordance with an embodiment it is proposed that a maximum deviation of a horizontal section of the actual model, in relation to the appropriate orientation of the pylon segment, from a circle or segment of a circle, is preset as the first predetermined limit value. The pylon segments to be produced are intended to be arranged in mutually superposed relationship when constructing a concrete pylon of a wind power installation. Therefore a very high degree of fitting accuracy for the directly mutually superposed pylon segments, namely the pylon segments which are placed one upon the other, is to be observed to ensure stability of the pylon to be produced. Those deviations relate to a horizontal section, that is to say a section transverse relative to the vertical axis of the concrete pylon. They make themselves perceptible in particular when placing pylon segments one upon the other and are therefore to be observed as accurately as possible.

A further configuration provides that the produced and measured pylon segment is treated as a reject if the deviation between the virtual actual model and the predetermined form, in particular therefore the virtual reference model, exceeds a second predetermined limit value, which is greater than the first predetermined limit value. Monitoring of two limit values is thus proposed, and if the value exceeds the first limit value that only leads to an improving modification to the concrete mold—in particular the shuttering—whereas an excessive deviation which is above the second limit value also leads to the part being rejected. If therefore the first limit value is exceeded but the second is not, it is assumed that the pylon segment produced is still within acceptable limits. The deviations are only of such a magnitude that adaptation of the concrete mold, in particular the shuttering, is intended for an improvement in the next pylon segment to be produced. The aim of monitoring the first limit value is therefore to continuously monitor and improve the quality of the pylon segment produced, and thus the pylon to be produced overall. Accordingly the first limit value can be selected to be very small.

It is only when the second limit value is exceeded—which should happen as rarely as possible—that this leads to the part being rejected and thus leads to the need to produce a new and improved pylon segment to replace the pylon segment which has just been sorted out as reject.

Preferably the process is such that in dependence on the given deviation, a correction value is calculated for alteration to the segment mold or for alteration to at least one shuttering forming the segment mold. The comparison of the virtual actual model with the virtual reference model makes it possible to detect a qualitative and quantitative deviation. Accordingly the deviations in terms of quality, quantity and location of the actual model from the reference model are very well known. The necessary changes to the shuttering can be correspondingly calculated therefrom as the shuttering substantially represents a negative form of the produced and measured pylon segment.

According to one embodiment of the invention there is also proposed an apparatus for measuring a pylon segment. Accordingly there is provided a measuring device for measuring geometrical dimensions of the pylon segment, in particular a laser measuring device. In addition there is provided a data processing device, in particular a computer, adapted to produce a virtual model from the geometrical data recorded by the measuring device and to implement a comparison of the virtual model with a predetermined form, in particular a comparison with the already existing virtual model, that is to say a comparison of actual model with reference model.

Preferably the measuring apparatus is adapted for carrying out a process as described above. Insofar as further apparatus components like a concrete mold or shuttering and/or an apparatus for modifying such a concrete mold or shuttering are necessary for the process, they respectively form a part of the measuring apparatus which in that respect can also be referred to as an optimization apparatus or production apparatus for a pylon segment. Preferably the measuring apparatus has fastening means with which it can be fastened to a pylon segment and/or a shuttering in order thus to measure that pylon segment or a pylon segment produced therewith.

The described measurement with subsequent comparison of the stated models thus concerns a final check in which the finished concrete segments are examined with a laser measuring method and corresponding laser measuring apparatus after they are finished. In particular this involves checking whether the contour is correct and in particular whether the segments are actually round. In that case the finished segment is scanned by means of the laser measuring system and a three-dimensional image is produced therefrom in the computer, which is compared to a 3-D model, that is to say the ideal form. This involves detecting slight deviations and possibly suitably adapting the shuttering. Thus for example a slight deviation from the optimum can be detected, whereupon adaptation of the shuttering is effected without however the measured segment having to be designated as a reject. Rather, subsequent adjustment is already proposed as the primary aspect, to achieve optimization of manufacture. In that respect, the aim is levels of accuracy in the millimeter range, and those levels are also attained, which could be usual for mechanical engineering, that is to say metalworking procedures, with orders of magnitude of the articles to be finished, but not in relation to general concrete production of such orders of magnitude.

Finally reproducibility of the produced concrete segments is also achieved by the proposed solution. Besides a general improvement in quality, this also permits interchangeability of elements which basically should be identical but which are not entirely the same because of manufacturing fluctuations. Such elements can be replaced by each other, by virtue of an improvement in reproducibility. That can be advantageous for example in parts storage because it is no longer necessary to identify each individual segment, but only types of segment, including the size thereof.

According to another embodiment of the invention there is also proposed a shuttering for the production of a pylon segment of a concrete pylon of a wind power installation. Such a shuttering is based on a pylon segment having an inner concave and an outer convex surface, as is the case with a cylindrical case segment or a case segment in the shape of a truncated cone. An inner shuttering element is provided for molding purposes for the inner concave surface which in use also faces towards the interior of the concrete pylon to be produced. That shuttering element can be for example a cylinder or a truncated cone or the like. A corresponding outer shuttering element is provided for the outer convex surface which is also substantially to form a part of the outside surface of the concrete pylon to be produced. The inner shuttering element can also be referred to as an inner shuttering or an inner shutter element, and the outer shuttering element can be referred to as an outside shuttering element or outer shuttering.

Both shuttering elements are adapted to be put together in such a way that formed between them is a receiving space for receiving a mass of concrete for casting the pylon segment to be produced. The two shuttering elements are therefore fitted together in such a way that this defines an annular gap or the like or a part thereof.

The outer shuttering, that is to say the outer shuttering element, has a displacement apparatus, in particular a plurality of wheels, for removing the outer shuttering from the pylon segment in the horizontal direction after hardening of the pylon segment, in particular for pulling the outer shuttering away, in order to clear the finished pylon segment.

After removal of the outer shuttering in that way the pylon segment which has just been produced is thus substantially free from one side and still lies with its other concave side against the inner shuttering. Nonetheless that pylon segment can now be removed from its position for example with a factory crane and moved to the position for further processing or further transport.

Hitherto it was known for the shuttering also to be lifted by means of a factory crane, frequently by means of the same factory crane with which the concrete segment is lifted. That is based on the idea that the shuttering is often of a similar weight to the finished pylon segment. The shuttering can be of a weight of 5 t to 10 t. Such a heavy object can scarcely be handled manually and for that reason factory cranes which can manage such weights were and are used. It was now recognized however that manual handling is nonetheless partly possible, but it is at least possible to manage handling without the factory crane. That can simplify handling and can reduce the time for which the factory crane is in use.

According to another embodiment of the invention it was realized that the outer shuttering is admittedly of great weight, but in return only needs to be displaced over a short distance. Added to that is the fact that factory floors in industrial production factories are often flat and horizontal. Therefore the problem of moving a heavy shuttering is concentrated on overcoming the frictional force involved when moving the shuttering horizontally. Therefore there is provided a displacement apparatus which is intended to reduce any frictional forces. In particular that is to be achieved by wheels or rollers.

Preferably the displacement apparatus has wheels or rollers for displacement of the outer shuttering element, that is to say the outer shuttering, on rails. As the shuttering upon removal from the finished pylon segment is intended to clear that and expose it, and is then to be pushed back into its molding position again afterwards, displacement on rails is advantageous because the rails predetermine the direction of movement and no further degree of freedom is required for movement of the shuttering. When the outer shuttering is pushed back into its initial position for the production of a further pylon segment the rails provide that the shuttering very accurately reaches its intended position. That is also substantially simpler than using a factory crane as complicated positioning is not required.

Preferably there is proposed a lever means provided for pulling or pushing the outer shuttering in order to release the outer shuttering from the hardened pylon segment. In that way it is possible to overcome an adhesive force which acts between the freshly hardened pylon segment and the outer shuttering. For that purpose the outer shuttering is moved by a very small distance and it is therefore possible to provide a significant lever action. In that way the outer shuttering can be pulled away from the finished pylon segment and such a lever can possibly be used again in order to further pull the outer shuttering. Preferably an engagement point to which such a lever can be fitted is let into the factory floor or a production floor, immediately beside the outer shuttering element which is to be pulled away, or there is provided an auxiliary support such as for example a base support member which rests on the factory floor and is itself supported against an object such as for example a base support stand on which the pylon segment is cast and which can be referred to as the production floor. The auxiliary support has an engagement point, in particular an engagement recess and/or engagement projection, for fitting the lever thereto. In that respect lever can be interpreted in the sense of a general design configuration, namely a long metal bar or steel tube. That can be fitted to the engagement point, such as for example in the engagement recess, and can be fixed a short distance thereabove in the lower region to the outer shuttering. The transmission of a high force is now possible by way of the other end of that lever—that is to say the bar or steel tube. The lever ratio of that example depends on the ratio of the total length of the lever to the spacing of the engagement point in the factory floor to the engagement point on the outer shuttering, and a tilt angle.

Preferably there is provided a lift means for lifting the outer shuttering or the outer shuttering element after hardening of the pylon segment so that the outer shuttering element can be so lifted that it only still puts a load on the travel apparatus. To prevent the liquid concrete from flowing out in the filling operation and prior to hardening, the movable outer shuttering, during the production procedure, should be applied fixedly to a support surface therebeneath, namely so firmly and sealingly that no concrete can escape. The described lift means are provided to be able to release an outer shuttering which has been set in position so fixedly in that way.

Preferably there is provided a separating means for separating the outer shuttering element from the pylon segment, comprising a pressure means, in particular a pressure screw for exerting a separating pressure for releasing the outer shuttering element from the pylon segment. Such a separating means is fixedly fastened to the outer shuttering element and by means of the pressure means can exert a pressure against a support element such as another outer shuttering element of the same concrete mold or another object, or conversely the separating means is arranged on the support element and presses against the outer shuttering element for separation purposes and thereby presses it away from the pylon segment.

Preferably the shuttering is adapted to trigger the lift movement of the lift means by a screw movement, in particular by means of a compressed air screwing means. The screwing movement makes it possible to achieve good force transmission, in which case it is possible also to achieve a self-locking action on the part of the lift device. Preferably actuation is provided by means of a compressed air screwing means. That means that the lift device has a suitable engagement location for such a compressed air screwing means and in particular that for actuation purposes it has a common screw head, for example a hexagonal screw head, of one of the sizes of 16 to 32 mm. In addition the lift device is preferably designed for a usual rotary speed and a usual torque of a compressed air screwing means.

The underlying idea here is that actuation of the lift device for lifting the heavy outer shuttering can be very time-consuming and involve a great deal of force, for manual actuation. By adaptation to a compressed air screwing means, such a screwing means which is often present in production factories can also advantageously be used for actuation of the lift device. The necessary additional complication and expenditure is thus slight. In that case, if the displacement apparatus has a plurality of distributed wheels or rollers, the lift means is so distributed that there is a lift means for each roller, each wheel or each pair of rollers or each pair of wheels or each group of rollers or each group of wheels. For example three wheels can be distributed over the outer shuttering to displace it on three rails, wherein there are provided three lift means, namely one for each wheel. If the outer shuttering is firstly set down on the factory floor or a production floor for finishing the pylon segment it can be lifted by means of actuation of the three lift means so that it only rests on said three rollers and can be comparatively easily displaced by way of said three rails. The separating means is preferably also adapted to be actuated by a compressed air screwing means. The separating means, in particular the pressure screw, is for that purpose adapted in a corresponding manner to the lift means.

In an embodiment there is proposed a production apparatus which has travel rails for guiding the displacement apparatus of the above-described outer shuttering element which can also be referred to as the outer shuttering. Preferably the travel rails are arranged on a floor, in particular a factory floor. In addition, provided on the floor is a lever attachment point, in particular a recess for attachment of the lever for at least partially withdrawing the outer shuttering from the hardened pylon segment. Thus such a production apparatus concerns a production factory or a part thereof, in which an outer shuttering according to the invention is provided. The production factory is adapted in particular in regard to rails and attachment point to the above-described displaceable outer shuttering.

Thus that solution overcomes problems involved in previous manufacture of concrete segments, in which hitherto outer shuttering elements and in particular conical shuttering halves which form the described outer shuttering were moved into position by crane. It is now proposed that such shutterings these can be half-shutterings, third-shutterings, quarter-shutterings and the like are displaceable, namely they are supported in particular on a rail system in order to push them into the position for manufacture of a concrete segment and to push them or pull them away therefrom again after hardening of the segment. Preferably there are provided separating means which push two half-shutterings away from each other and thereby provide for initial release of such a half-shuttering or the like, in particular an outer shuttering, from the hardened pylon segment. Such a separating means can act similarly to a screw, and can have a screw as a pressure means, namely a pressure screw, and can convert a rotary movement into an axial force for separation of the elements. That separating means is preferably also of such a configuration that it can be actuated by means of a compressed air screwing means.

The lift means can preferably be so designed that actual lifting of the shuttering is effected by means of one or more appropriately strong springs and the shuttering is lowered into its position for finishing a concrete part by screwing acting against the spring force, that is to say compressing the springs. That is preferably to be intended for use with a compressed air screwing means as described above. The corresponding springs can thus be so designed that they are only a little less strong than would be necessary for lifting the shuttering in question. In order now to lower the shuttering the pressing force needed is only of a value corresponding to the amount by which the spring is stronger than the force due to the weight of the shuttering. If therefore the shuttering weighs for example 10 t and the springs are designed for 11 t, they only need to be pushed down by the above-mentioned screws with an additional force of a ton. Without using those springs, instead a lifting force for completely lifting the 10 t would have to be applied by screwing. It will be appreciated that said necessary forces are distributed among the number of lift means.

In addition there is proposed a process for the production of a pylon segment of a concrete pylon of a wind power installation. Accordingly the following production steps are successively performed.

Firstly a mass of concrete is poured between an inner shuttering element and an outer shuttering element, and hardens in the following step. After hardening the outer shuttering element is separated from a counterpart body like a further outer shuttering element. For that purpose in particular one or more screws of the one outer shuttering element is or are screwed against the counterpart body in order thereby to provide for such separation. In particular the procedure is operating here against an adhesion force between the respective outer shuttering element and the freshly cast and hardened pylon segment.

Next the outer shuttering element is lifted by means of a suitable lift means so that it only still applies a load to a displacement apparatus arranged on the outer shuttering element. Finally the outer shuttering element which is supported in that way can be pulled away in a horizontal direction, using the displacement apparatus. Preferably lifting is effected by means of a lift means which is fixedly connected to the displacement apparatus, wherein the lift means is actuated by means of an automatic screwing means, in particular a compressed air screwing means, in order thereby to produce the lifting movement. Preferably, when producing a concrete segment, the outer shuttering element is firstly lowered by means of the lift means by the lift means being actuated by means of an automatic screwing means.

In particular such a production process employs the above-described shuttering and/or the above-described production apparatus for manufacture of pylon segments using such a shuttering.

According to another embodiment of the invention there is also proposed a concrete pylon of a wind power installation. It includes a plurality of pylon segments of differing size and made of concrete, which are placed one upon the other and which are made from steel-reinforced concrete, that is to say which have a steel reinforcement. The pylon is therefore made from precast concrete parts. In that respect the shape of the concrete pylon is so selected that it has an external contour which follows an e-function. Talking in graphic terms, such a concrete pylon, if it were lying horizontally in such a way that its pylon head is towards the left and its pylon base towards the right, is of a contour whose upper line corresponds to an e-function in its general usual form.

In particular the periphery U of the concrete pylon decreases from a periphery $U_0$ in the lower region of the pylon—here once again it is assumed that the pylon is in the operationally appropriate standing position—in particular at the pylon base above a foundation, with increasing height h with an e-function, namely in accordance with the formula:

$$U=U_0 * e^{-h*c}$$

The variable c can be used here as an adjustment factor for adjusting an elongation or gradient. At the same time the adjusting factor c is used for standardization of the exponent so that the exponent is unit-less.

The use of that outside contour or increase or reduction in periphery in accordance with an e-function affords a precast concrete part pylon which is of a slender configuration substantially in its upper region and at the same time provides a stable pylon base, with the transitions being continuous. The slender upper part of the pylon is of significance in particular also in the case of wind power installations because the pylon represents a wind shadow which should be kept as small as possible for the respectively passing rotor blade.

To construct such a concrete pylon with a contour in accordance with an e-function from precast concrete parts, they are to be appropriately manufactured. The shutterings which are used for manufacture of the corresponding pylon segments must be appropriately adapted to ensure said e-function of the concrete pylon in its entirety.

The e-function can also be approximated by pylon segments in the sense of a polygon and in particular by segments each having a straight, that is to say non-curved, contour portion.

According to another embodiment of the invention there is also proposed a concrete pylon group comprising at least a first and a second concrete pylon of a wind power installation according to claim 23. Each of those concrete pylons has a plurality of mutually superposed pylon segments of different size and of concrete. A pylon segment or a plurality of pylon segments arranged at the same height form a segment plane. In the simplest case, in particular in the upper region of the pylon, the segment plane can be formed by an individual, substantially frustoconical pylon segment. In the case of larger segment planes which are arranged in particular further downwardly, they are composed of a plurality such as for example two half-shuttering portions.

In that case the concrete group has at least two pylons of differing sizes, wherein the first pylon is larger than the second pylon, namely has more segment planes than the second pylon, at least one further segment plane than the second. In that respect it is proposed that the first and second pylons have segment planes with identical pylon segments but at different heights.

It is thus proposed that identical segment planes are proposed for different concrete pylons and thus identical pylon segments are used for different pylons. In particular it is proposed that use is made of respective concrete pylons which have an outside contour as described above, in accordance with an e-function. In relation to the above-indicated formula however that means that the periphery $U_0$ at the pylon base is also of different size, for pylons of differing sizes. Preferably the pylons are the same in portion-wise manner in their upper regions. Expressed in simplified terms, the larger concrete pylon corresponds to the smaller concrete pylon, wherein some more pylon segments are placed under that smaller concrete pylon. The actual construction of a concrete pylon is naturally effected in a different way, namely successively from the foundation, that is to say from the pylon base.

If the concrete pylon group includes for example a first concrete pylon with 20 segment planes and a second concrete pylon with 10 segment planes, wherein in each case the first segment plane forms the uppermost segment and the twentieth segment plane of the large pylon or the tenth segment plane of the small pylon forms the lowermost segment plane, it is proposed for that configuration by way of example that the first to tenth segment planes of the large pylon and of the small pylon are of the same size. The large pylon, for its construction, can therefore have recourse for the first to tenth planes, to the structure of the small pylon. In that respect some details may possibly be different. In particular, the tenth plane of the small pylon might have an opening for a door which is not to be provided in the tenth plane of the large pylon.

Accordingly, for production purposes, it is only necessary to produce and provide pylon segments for a total of 20 different segment planes, instead of for 30 different segment planes. If a further medium pylon is to be added, which for example has 15 segment planes, there is no need to provide a pylon segment of a fresh size. For these three different concrete pylons which are given by way of example, it is then only necessary to provide pylon segments for 20 different pylon segment planes instead of for 45 pylon segments.

That has a particularly advantageous effect for concrete pylons with a pylon contour following an e-function. Here the large wind power installation pylon which is in the shape of an e-function has in its upper region an e-function shape corresponding to that of a smaller pylon. In that respect the large pylon also forms an overall contour in the shape of an e-function without kinked or otherwise discontinuous transitions. The e-function shape permits the described modular construction of the pylons of differing sizes.

There is also proposed a wind park which includes a concrete pylon and a concrete pylon group with concrete pylons. In that respect the term wind park is used to denote an arrangement of a plurality of wind power installations which each have a respective concrete pylon and which are subject to a common overall control and/or which use a common connecting point for feeding electric energy into an electric network.

According to yet another embodiment of the invention there is also proposed a process for the production of concrete pylons of wind power installations. In accordance therewith this involves concrete pylons with a plurality of mutually superposed pylon segments of differing sizes. The process therefore concerns the manufacture of concrete pylons from precast concrete parts.

Firstly pylon segments are made from steel-reinforced concrete in 1 to k different sizes wherein k is a whole positive number of greater than 2, wherein at least one respective pylon segment is produced for each size of 1 to k. Therefore a plurality of pylon segments such as for example two half-shuttering portions can also be used for the same planes.

A plurality of pylon segments are then selected from the pylon segments produced in that way, to construct a concrete pylon, wherein the selection is dependent on the size of the pylon to be constructed. For building a concrete pylon of a first size, at least one pylon segment of each of sizes 1 to k is used. For constructing a concrete pylon of a second size at least one pylon segment of each of the sizes 1 to j is used. The variable j is a whole number greater than 1 and less than k. In that case the concrete pylon of the second size is smaller than the concrete pylon of the first size and the smaller concrete pylon uses fewer pylon segments for building it than the larger concrete pylon. Finally the respective pylon is built up, using the selected pylon segments.

In other words the process proposes that, when constructing the pylon, the necessary pylon segments are selected only in accordance with the size thereof, and the same pylon segments are used for large and small pylons. The pylon segments of the sizes 1 to j are thus intended for the large and the small pylon. The large pylon only additionally requires the pylon segments of the sizes j+1 to k, or the size k, if j+1 is identical to k.

Preferably the pylon segments of the sizes 1 to j for constructing the second smaller concrete pylon are identical to the pylon segments of the sizes 1 to j for constructing the first larger concrete pylon.

It is thus advantageous that the same pylon segments are used for constructing the concrete pylon of the first sizes, as for constructing the concrete pylon of the second size, and in addition further pylon segments are used for constructing the concrete pylon of the first size. In that respect the same pylon segments are used for an upper pylon region and the further pylon segments which are not used in relation to the smaller one are used for a lower pylon region which is correspondingly arranged beneath the upper pylon region.

Preferably concrete pylons are constructed as described above or concrete pylons for concrete groups are constructed as described above or concrete pylons for a wind park as described above.

In addition there is proposed a pylon segment for constructing a concrete pylon of a wind power installation, which is adapted to construct a concrete pylon as described above or a concrete pylon group as described above. In particular the pylon segment is suitably adapted to the shape of the concrete pylon to be constructed in order in the constructed condition of the pylon to form a sub-portion thereof.

According to another embodiment of the invention there is proposed a fastening anchor for securing a pylon segment of a concrete pylon to be constructed of a wind power installation when transporting the pylon segment on a flat-bed truck. That fastening anchor has an anchoring portion to be concreted in the pylon segment. Tensile loadings are then to be applied by way thereof to the pylon segment. In addition there is provided an elongate, in particular cylindrical shaft region fixedly connected to the anchoring portion. That shaft region is so adapted for being concreted in the pylon segment that a connecting side that is remote from the anchoring portion terminates with an outside of the pylon segment. The shaft region has a female screw thread for screwing in a connecting eye for fastening a shackle. In addition or alternatively the anchoring region has a portion which is enlarged in comparison with the shaft region in order to have a firm hold in the pylon segment and to transmit tensile loadings to the pylon segment.

That fastening anchor is adapted to be fixedly concreted in the pylon segment, in particular in a wall thereof, wherein only an opening is accessible from the exterior, in particular to screw therein a further fastening means. Thus a fastening eye can be screwed in there and then the pylon segment can be strapped down fast on a flat-bed truck—for example by means of shackles.

Preferably the fastening anchor is made from steel to be able to carry the highest possible loading.

According to an embodiment of the invention there is further proposed a pylon segment for constructing a concrete pylon of a wind power installation. That is characterized by at least one fastening anchor which is let into a wall of the pylon segment or which is passed through the wall to fasten the pylon segment upon transport on a flat-bed truck by means of the fastening anchor, in particular to tie it down, wherein the fastening anchor has a female screw thread accessible from the exterior for screwing in a connecting eye for fastening a shackle.

Such a pylon segment uses in particular a fastening anchor as described above and can thus advantageously be strapped down when being transported on a flat-bed truck.

That fastening option by means of a female screw thread in the fastening anchor permits specifically targeted lashing down on a flat-bed truck. The corresponding lashing belts or cables or chains only need to be fastened to the fastening anchor and to the flat-bed truck. Short lashing straps or the like can be used depending on the respective position of the fastening anchor in the pylon segment. The fastening anchor also provides a clearly defined attachment point which cannot slip. In addition a described connecting eye can be easily screwed out of the pylon segment, namely the fastening anchor, after transport, and does not impede further construction of the concrete pylon. If desired the remaining opening of the fastening anchor can be closed at the outside of the segment by a blind plug.

Preferably such a fastening anchor is concreted in place upon manufacture of the concrete segment in question. If the anchor is not concreted in place in that way, then using a subsequently produced bore, a fastening anchor which is adapted to that bore is partially passed through the segment wall and used for fixing and lashing down the transport segment upon transport thereof.

Advantageously the fastening anchor has an elongate, in particular cylindrical shaft region provided on one side with an anchoring region and on another side with an opening to a female screw thread. The shaft region is preferably concreted into the pylon segment in such a way that with one side it terminates with a surface of the pylon segment in such a fashion that the connecting eye can be screwed from the outside into the female screw thread.

To ensure a secure hold for the fastening anchor in the concrete it has an anchoring region which is markedly enlarged in comparison with the shaft region. That anchoring region is to be completely concreted in the pylon segment in order thereby to transmit loadings which can occur when lashing down the pylon segment, to the pylon segment.

According to an embodiment of the invention there is also proposed a securing apparatus. Such a securing apparatus includes a fastening anchor as described above, a connecting screw for screwing into the female screw thread of the fastening anchor, wherein said connecting screw has a fastening portion for fixing a shackle therein such as for example an eye, and optionally such a shackle is provided for fastening to the connecting screw as part of the securing apparatus. In that way the pylon segment can be easily and securely tied down by means of such a securing apparatus— or a plurality thereof—on a flat-bed truck.

Preferably the connecting screw has a support edge for supporting the connecting screw in the screwed-in condition at or against a segment wall of the pylon segment. If the fastening anchor is concreted in the pylon segment in such a way that only an opening of a female screw thread terminates with a surface of the pylon segment in question, then the connecting screw with the support edge can be screwed therein until its support edge presses against that wall of the pylon segment. That provides a firm and tilt-resistant connection between the connecting screw and the pylon segment. The female screw thread into which the screw is screwed provides a tensile loading and prevents the screw from coming loose from the pylon segment. In that case the support edge prevents a tilting movement of the connecting screw. That is advantageous in particular for a tying-down arrangement which does not extend in the axial direction of the connecting screw or the female screw thread, but inclinedly or even perpendicularly thereto.

Optionally there is provided a buffer disc for arrangement between the support edge and the segment wall. That buffer disc can be made for example from a plastic material in order optionally to accommodate elasticities and/or to compensate for slight surface inaccuracies of the segment wall.

According to an embodiment of the invention there is further proposed a process for the production of a pylon segment. This concerns a pylon segment for constructing a concrete pylon of a wind power installation. Firstly there is provided a shuttering for pouring the pylon segment in the form of a precast concrete part. Then or in that case a fastening anchor as described above is arranged in a desired position and so fixed that it can retain its position when concrete is poured into the shuttering. Then the concrete is poured into the shuttering so that the pylon segment is produced and the fastening anchor is cast in the predetermined position.

In particular a pylon segment as described above with fastening anchor fitted therein is produced in that way.

In principle the described processes for the production of pylon segments or for the construction of concrete pylons can be combined together or individual features from individual described processes can be combined together if that is not technically contradictory. The described pylon segments can also be combined in the sense that features which have been described in another context can be used if that is not technically contradictory. The same applies to the described concrete pylons. In relation thereto in principle all described features can also be combined if that is not technically contradictory.

By way of example a pylon segment provided for the construction of a concrete pylon having a contour in the shape of an e-function, can have a fastening anchor or other transport securing aids, as was described at another location.

BRIEF DESCRIPTION OF THE SEVERAL VIEWS OF THE DRAWINGS

The invention is described by way of example hereinafter by means of embodiments with reference to the accompanying Figures.

FIG. 9 shows a plan view of the view in FIG. 8.

DETAILED DESCRIPTION

Some aspects of the present invention are described by way of example hereinafter by means of embodiments by way of example. Although some aspects are described separately they can nonetheless also be combined with the others in accordance with the invention insofar as that does not represent a technical contradiction. Hereinafter identical references are used for similar but possibly non-identical features. At any event however identical references identify functionally identical features.

Figure 1:
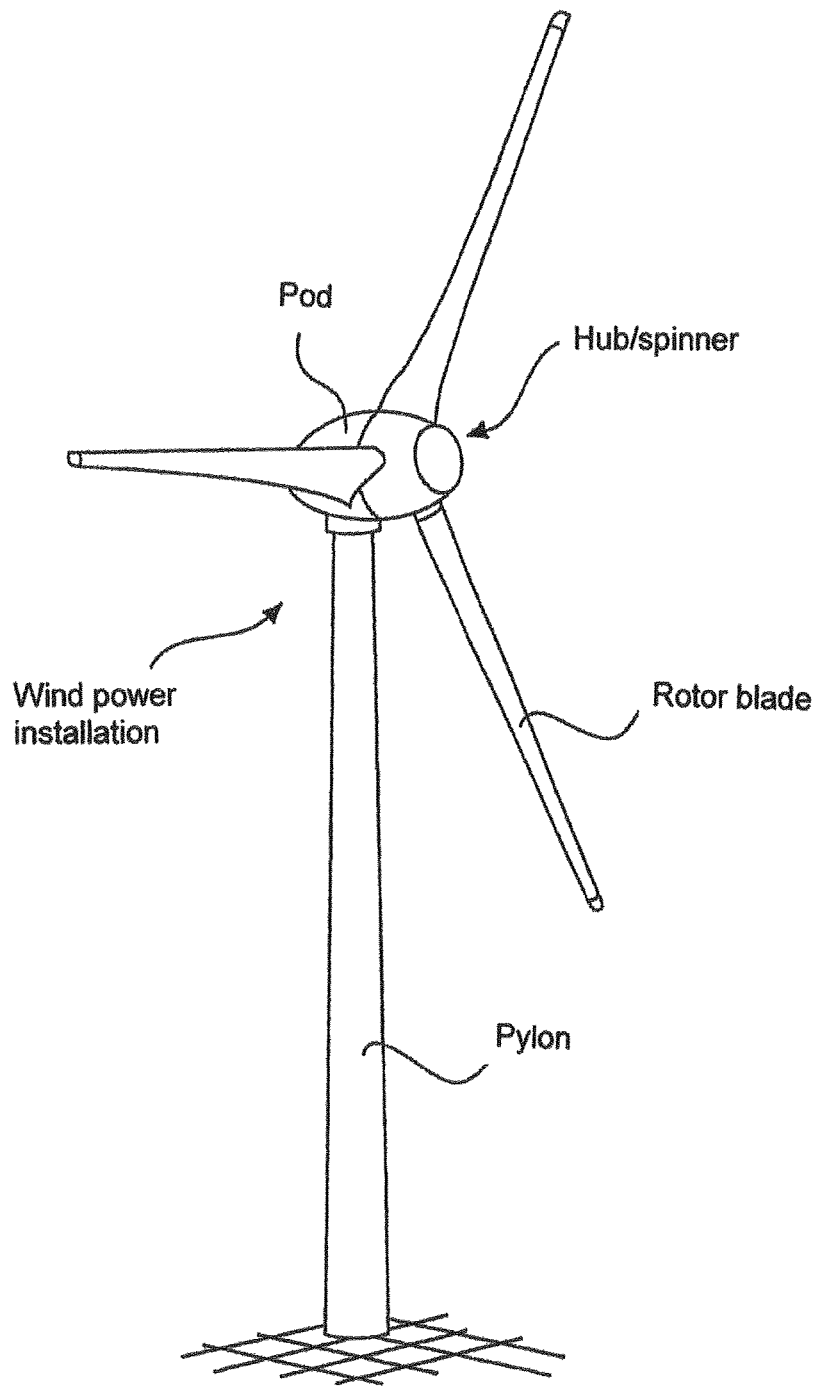
FIG. 1 shows a perspective view of a wind power installation.
Figure 2:
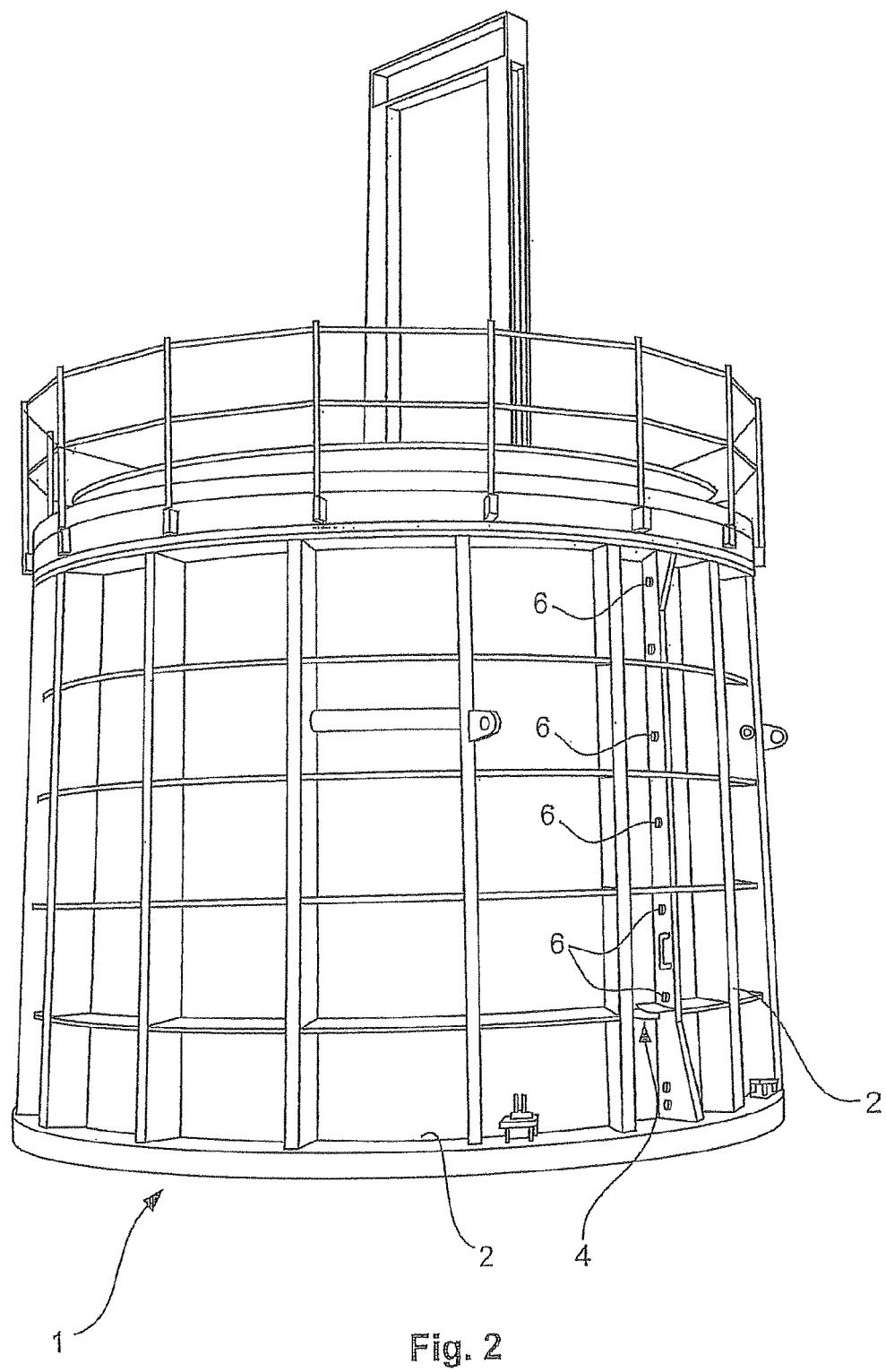
FIG. 2 shows a perspective view of a shuttering for a pylon segment.

FIG. 2 shows a shuttering 1 provided for the production of a pylon segment of an approximately frustoconical configuration. Alternatively it would be possible in principle to produce for example two half-case portions which fitted together are of a substantially frustoconical configuration. For that purpose the shuttering has an inner shuttering element and two outer shuttering elements 2 in the shape of half-case portions. The two outer shuttering elements 2 are fixedly assembled at two contact edges 4 and together form a frustoconical casing embracing the pylon segment or the pylon segment to be produced. The two outer shuttering elements in the form of half-case portions are fixedly joined together by means of connecting screws 6 at the contact edges 4. Formed between those two outer shuttering elements 2 which are connected in that way and an inner shuttering element which cannot be seen in FIG. 2 is an annular gap into which liquid concrete is to be introduced to produce a pylon segment. In that respect FIG. 2 shows an entirely general structure of such a shuttering 1 which can also be used without features according to the invention.

Figure 3:
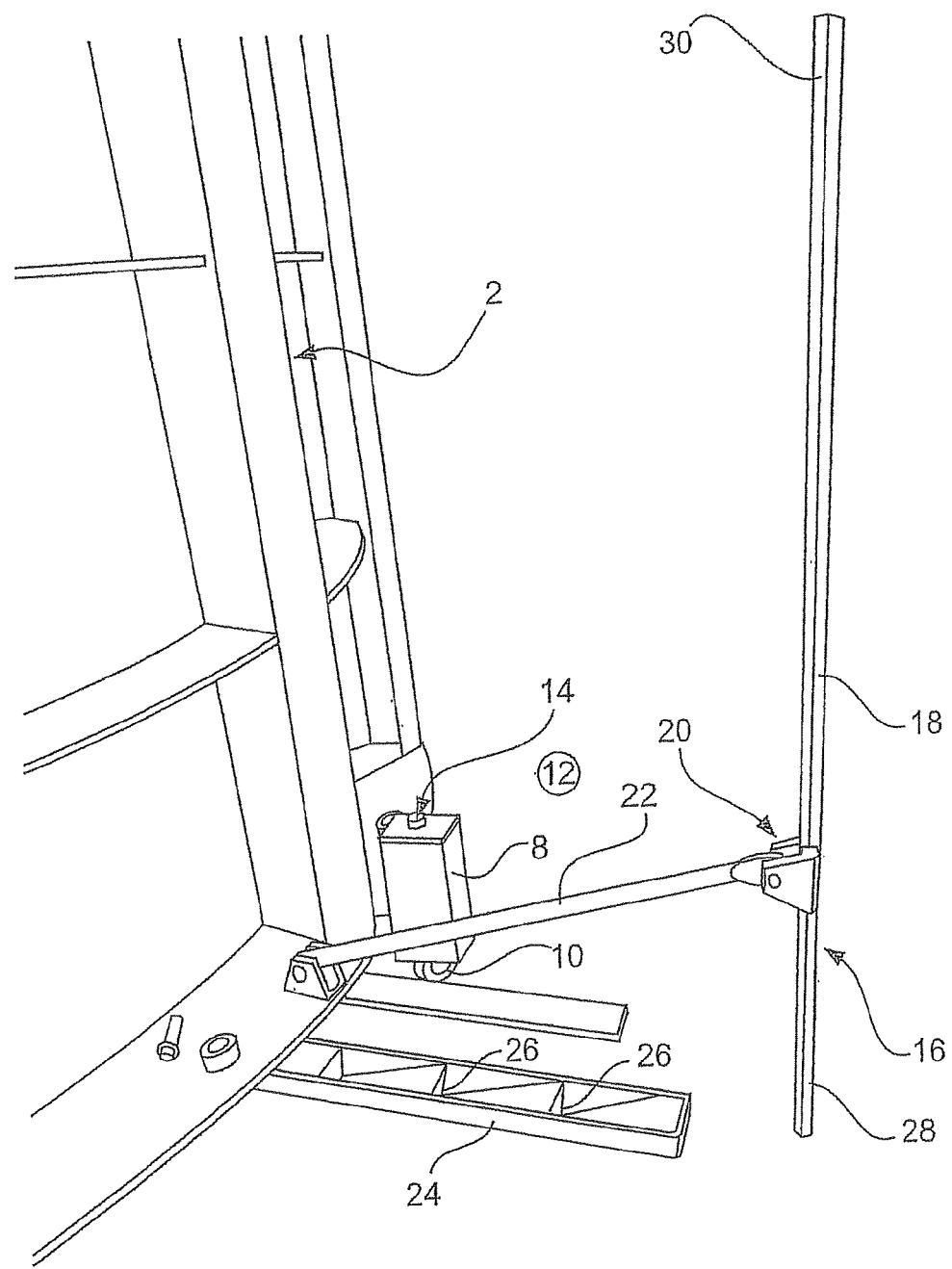
FIG. 3 shows a portion of a displaceable shuttering with a lever system and a part of a displacement apparatus as a perspective view.

FIG. 3 shows a portion of an outer shuttering element 2 provided with a displacement apparatus. That displacement apparatus includes a plurality of rolling blocks 8, of which one is shown in FIG. 3. The rolling block 8 has a wheel 10 which projects downwardly out of the rolling block and can roll on the illustrated factory floor 12 in order thereby to permit movement or displacement of the outer shuttering element 2.

The wheel 10 is mounted movably in the rolling block 8 and is urged by means of a spring downwardly out of the rolling block 8 into the illustrated position. The wheel 10 can be pulled into the rolling block against a spring force of the spring by means of an actuating element, namely an actuating screw 14. In that way the outer shuttering element 2 which is fixed to the rolling block 8 moves downwardly. The actuating screw 14 is adapted in respect of its shape, size and accessibility for actuation by means of a compressed air screwing means. Downward movement or also lifting again can thus be easily implemented by a compressed air screwing means or a pressure air screwing means. The rolling block 8 thus forms a lift means with which the outer shuttering element 2 can be raised or lowered and which is combined with a wheel 10 for displacement of the outer shuttering element 2. That is only an example of a combination of a lift means having a wheel or a roller.

FIG. 3 also shows a lever means 16 which substantially comprises a lever bar 18. The lever bar 18 is movably connected in its lower region at a connecting hinge 20 to the outer shuttering element 2 by way of a tie bar 22.

In addition a lever attachment rail 24 is arranged on the factory floor 12. The lever attachment rail 24 forms a support aid. The lever bar 18 can be attached to those lever attachment points 26 with an attachment portion 28 arranged in its lower part. The outer shuttering element 2 can be pulled back by pulling in the handle region 30 arranged upwardly on the lever bar, namely towards the right in the view shown in FIG. 3, in order thereby to liberate a hardened concrete segment. The lever attachment rail 24 can be adapted to be mobile in order to be used at different outer shuttering elements 2.

Figure 4:
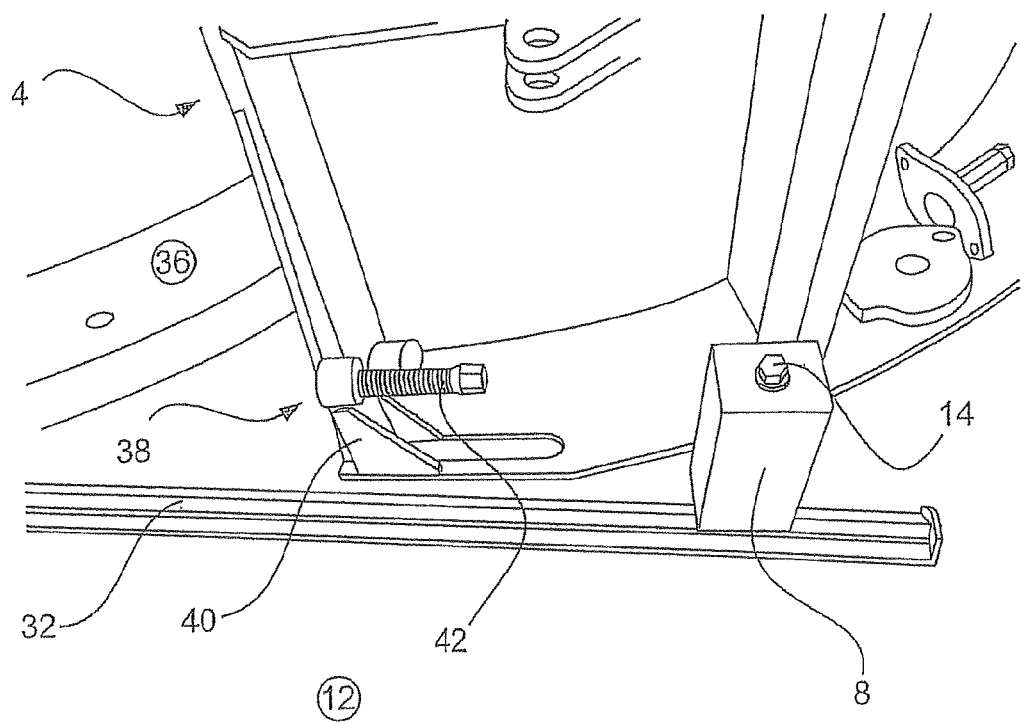
FIG. 4 shows a detail of a displaceable shuttering including a part of a lift means and a separating means for separating two shutterings in the form of half-shuttering portions from each other.

FIG. 4 shows another portion of the outer shuttering element 2 in FIG. 3. A further rolling block 8 with a further actuating screw 14 can be seen in that portion. This rolling block 8 also has a wheel 10 which projects downwardly out of the rolling block 8 and thus bears the outer shuttering element 2 at the illustrated height above the factory floor 12. The wheel 10 cannot be seen here by virtue of the perspective view adopted. FIG. 4 however shows a running rail 32 which guides the rolling block 8 with its downwardly projecting wheel. The running rail 32 can also be referred to as a travel rail.

FIG. 4 also shows a part of a finished pylon segment 34 and a mold bottom 36 with which two outer shuttering elements 2 and an inner shuttering element together form a concrete mold for production of the illustrated pylon segment. FIG. 4 shows an opened position in which the outer shuttering element 2 has already been pulled away from the pylon segment 34 to clear it.

FIG. 4 also shows on the outer shuttering element 2 a separating means 38 which can also be referred to as a separating element. In the closed condition, when concrete can be poured into such a mold or can harden therein, the outer shuttering element 2 as shown in FIG. 4 is connected to a further outer shuttering element 2 at its contact edge 4, as can be seen in FIG. 2. The separating means 38 is provided to implement or facilitate separation of two outer shuttering elements 2 connected in that way. The separating means 38 has a fastening and guide portion 40 with which the separating element is fixedly connected to the outer shuttering element 2. A pressure screw 42 is provided on the fastening and guide portion 40, as a further component of the separating means 38. In relation to that screw 42, the other outer shuttering element which is not shown in FIG. 4, in the region of its contact edge, has a pressure region against which the screw 42 is to be screwed. When the screw 42 is screwed against that pressure region—which corresponds to screwing towards the left in FIG. 4—the two outer shuttering elements 2 are pressed apart in that way. The screw 42 is also adapted to be actuated with a compressed air or pressure air screwing means. The hexagonal shape of the head 44 of the pressure screw 42 corresponds in its size and nature to the actuating screw 14 of the rolling block 8. Accordingly, both the actuating screw 14 and also the pressure screw 42 can be actuated by one and the same tool in a simple fashion.

An outer shuttering element like the outer shuttering element 2 is thus efficiently displaceable in that rollers or wheels are provided for displacement thereof and/or separating elements like the separating element 38 are provided for separating two outer shuttering elements and/or a lift means like the rolling block 8 is provided for lifting and lowering the outer shuttering element and/or a lever means like the lever bar 18 with its tie bar 22 and the lever attachment rail 24 are provided.

Figure 5:
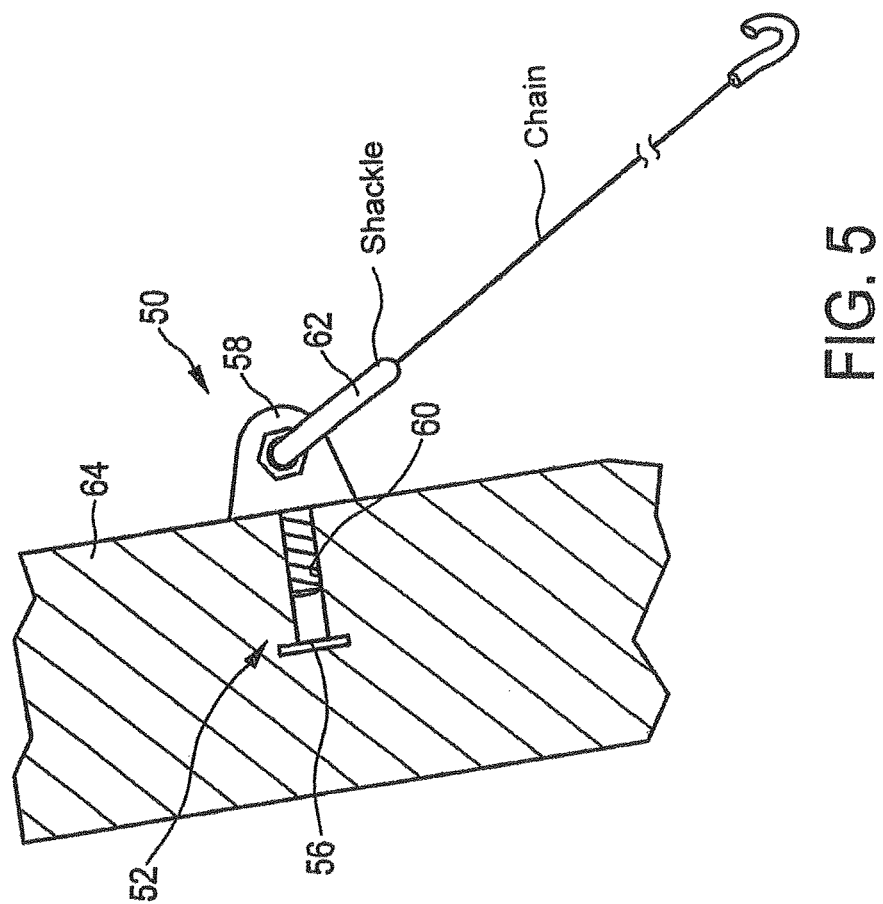
FIG. 5 shows a securing apparatus for securing a pylon segment upon transport in its proper arrangement in a partly sectional diagrammatic side view.

FIG. 5 shows a securing arrangement 50 for securing a pylon segment in transportation thereof, comprising a fastening anchor 52 having a shaft region 54 and an anchoring region 56. The securing arrangement 50 further includes a connecting eye 58 which is screwed into a female screw thread 60 in the shaft region 54 of the fastening anchor 52. A connecting shackle 62 is shackled to the connecting eye 58. FIG. 5 shows the securing arrangement 50 in a partly sectional side view, with the fastening anchor 52 being let into the wall of a pylon segment 64. The connecting eye 58 is thereby fastened to the wall 64 of the pylon segment in such a way as to be tensile force-resistant and tilt-resistant, and the pylon segment can be lashed down by way of the shackle 62.

Figure 6:
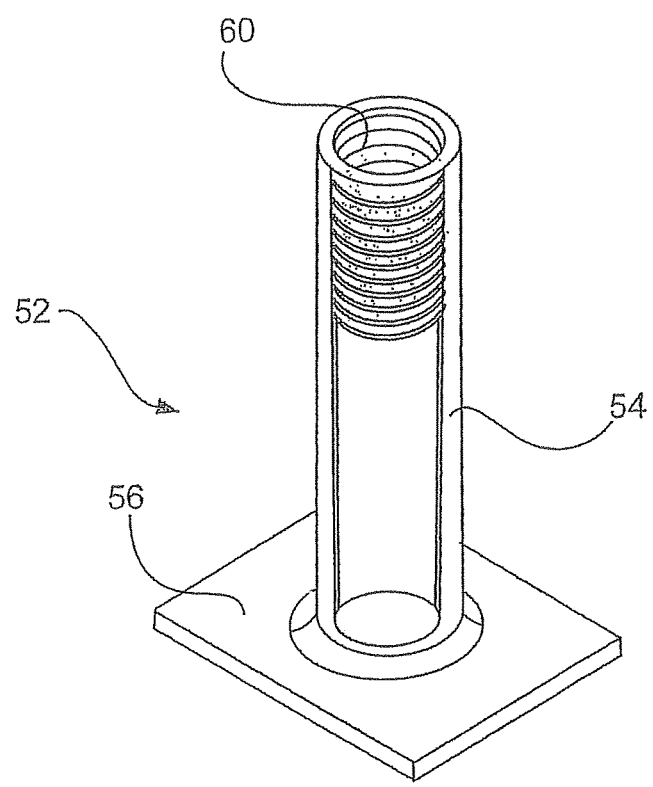
FIG. 6 shows a diagrammatic perspective view of a fastening anchor.

FIG. 6 shows a diagrammatic perspective view of the fastening anchor 52. The anchoring region 56 is here in the form of a rectangular base and is welded to the shaft region 54. The shaft region 54 is hollow and in its upper portion in FIG. 6 has a female screw thread 60 into which a connecting eye or screw can be screwed. After transport has been performed, any lashing can be released and the connecting eye can be unscrewed from the fastening anchor 52. To avoid the ingress of moisture or other foreign substances, a blind plug can then be screwed into the female screw thread 60 or fitted in some other way into the shaft region 54 in the region of the female screw thread 60. Preferably such a blind plug is made from plastic material, in particular in the form of a plastic injection molding.

Figure 7:
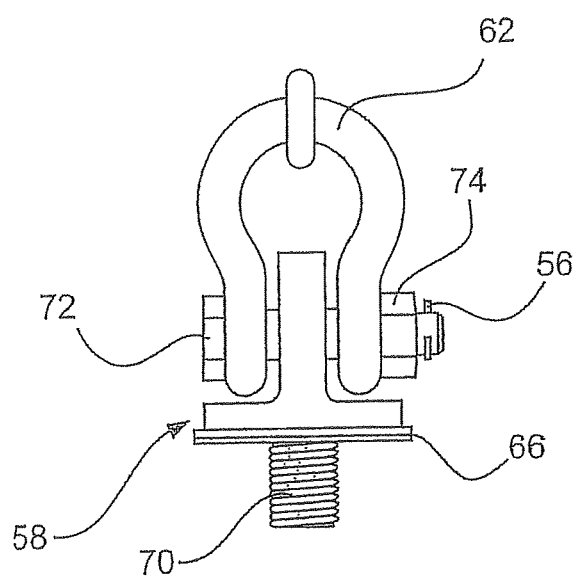
FIG. 7 shows a plan view of a connecting eye with a shackle fitted therein, FIG. 8 diagrammatically shows a side view of a pylon segment fastened by means of two securing apparatuses on a flat-bed truck.

FIG. 7 shows a plan view on an enlarged scale of the connecting eye 58 with buffer disc 66 and connecting shackle 62 shackled thereto. The connecting eye 58 which can generally also be referred to as a connecting screw has a screw portion 70 for screwing into the female screw thread 60 of the fastening anchor 52. The shackle 62 is fixed to the connecting eye 58 by means of a fastening screw 72 and fastened and secured by means of a nut 74 and a securing pin 76. In principle the shackle 62 can also be provided as part of a lashing arrangement, for example as part of lashing chains or lashing straps in order then to be fastened by means of the fastening screw 72 to the connecting eye 58 to prepare for lashing down.

Figure 8:
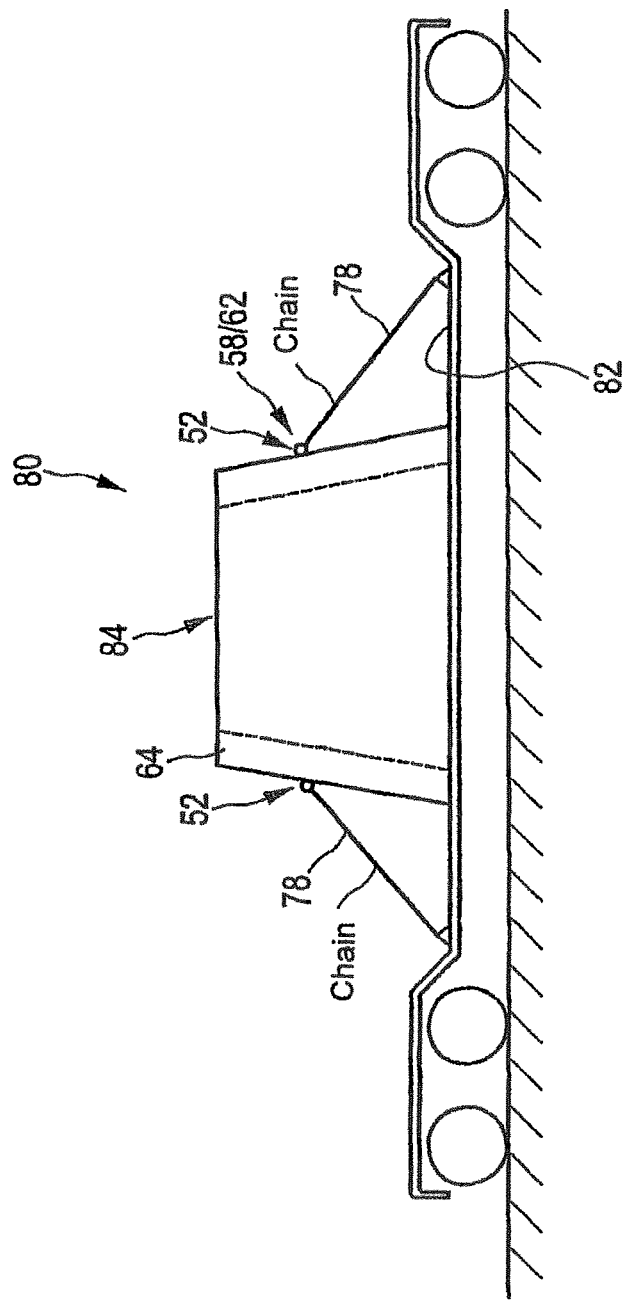

FIGS. 8 and 9 diagrammatically show a pylon segment 80 which is lashed down by means of lashing chains 78. In this case a fastening anchor 52 is let into the wall 64 of the pylon segment 80. The lashing chains 78 are connected to the pylon segment 80 by way of a respective connecting eye 58 and a connecting shackle 62, and at the same time connected to the support 82. The support 82 is only diagrammatically illustrated and can represent for example a load surface of a flat-bed truck.

This therefore affords a simple and efficient fastening and in particular lashing option for the pylon segment 80 upon transport thereof. A lashing arrangement in which a lashing strap would be passed over the upper edge 84 of the pylon segment 80 entails a high risk of slipping, which can be avoided by the illustrated solution. With that solution, the fastening anchor 52 is easily incorporated in manufacture of the pylon segment 80, that is to say when casting it. That can also be effected in a simple fashion by the fastening anchor 52 being fixedly arranged in the desired position in the concrete shuttering or mold in question, when pouring the concrete pylon segment 80.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A process for making pylon segments for a concrete pylon of a wind power installation, the process comprising:
providing a segment mold having at least one shuttering for predetermining a shape of the pylon segments and for filling with concrete;
filling the segment mold with concrete;
hardening the concrete to form a first pylon segment;
measuring the first pylon segment for the production of a three-dimensional virtual actual model of said first pylon segment;
producing said three-dimensional virtual actual model;
comparing the three-dimensional virtual actual model to a three-dimensional virtual reference model;
determining a deviation between the virtual actual and virtual reference models;
comparing the deviation to a first threshold value;
modifying the segment mold when the deviation exceeds the first threshold value; and
using the modified segment mold to form a second pylon segment.

2. The process according to claim 1 wherein measuring the first pylon segment includes using a laser measuring device for measuring the first pylon segment.

3. The process according to claim 1 wherein measuring the first pylon segment is effected with an accuracy of 5 mm or higher, and the first threshold value is 10 mm or less.

4. The process according to claim 1 wherein a maximum deviation of a horizontal section of the virtual actual model is preset as the first threshold value.

5. The process according to claim 1 wherein the first pylon segment is treated as a reject if a deviation between the virtual actual model exceeds a second threshold value, wherein the second threshold value is greater than the first threshold value.

6. The process according to claim 1 wherein a correction value is calculated in dependence on the deviation for altering the segment mold.

7. The process according to claim 1 further comprising:
wherein measuring the first pylon segment comprises using a laser measuring device to measure geometrical dimensions of the first pylon segment; and
wherein producing said three-dimensional actual model comprises using a data processing device to produce the virtual actual model.

* * * * *